(12) United States Patent
Wu

(10) Patent No.: US 8,199,121 B2
(45) Date of Patent: Jun. 12, 2012

(54) CONTROL SYSTEM AND METHOD FOR MANUAL PULSE GENERATOR

(75) Inventor: Chien-Chung Wu, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 665 days.

(21) Appl. No.: 12/393,554

(22) Filed: Feb. 26, 2009

(65) Prior Publication Data

US 2010/0175932 A1 Jul. 15, 2010

(30) Foreign Application Priority Data

Jan. 13, 2009 (CN) .......................... 2009 1 0300166

(51) Int. Cl.
*G06F 3/041* (2006.01)
*G06F 19/00* (2011.01)
(52) U.S. Cl. ....................................... 345/173; 700/173
(58) Field of Classification Search .................. 345/173; 700/173
See application file for complete search history.

(56) References Cited

U.S. PATENT DOCUMENTS 6,317,646 B1 * 11/2001 de Caussin et al. ........... 700/173
2009/0261990 A1 * 10/2009 Wu et al. .......................... 341/20
* cited by examiner

*Primary Examiner* — Kevin M Nguyen
*Assistant Examiner* — Sepideh Ghafari
(74) *Attorney, Agent, or Firm* — Altis Law Group, Inc.

(57) ABSTRACT

A control system of a manual pulse generator for controlling a rotation speed and a rotation direction of a motor includes a touch panel, a timer, a coordinate calculation unit, and a wave generation unit. The touch panel receives a contact signal and generates an electrical signal according to the contact signal. The timer records the amount of time used to input the contact signal. The coordinate calculation unit calculates coordinates of each input point of the contact signal on the touch panel according to the electrical signal to determine direction of the contact signal and input speed for the contact signal. The wave generation unit generates a pulse signal to control the motor according to the direction of the contact signal and the input speed for the contact signal.

17 Claims, 3 Drawing Sheets

CONTROL SYSTEM AND METHOD FOR MANUAL PULSE GENERATOR

BACKGROUND

1. Technical Field

The present disclosure relates to control systems and control methods, and particularly, to a control system and a control method for a manual pulse generator used in a computer numerical control (CNC) device.

2. Description of Related Art

Manual pulse generators are devices normally associated with a CNC device. An ordinary manual pulse generator generates electrical pulses to be sent to a CNC device controller. The controller moves a functional part of the CNC device a predetermined distance for each pulse. Most manual pulse generators use rotors to generate pulse signals to control the CNC device tool. Inclusion of the rotors, along with other elements, requires considerable size and weight for the manual pulse generator, making it difficult to use for prolonged periods.

DETAILED DESCRIPTION

Figure 1:
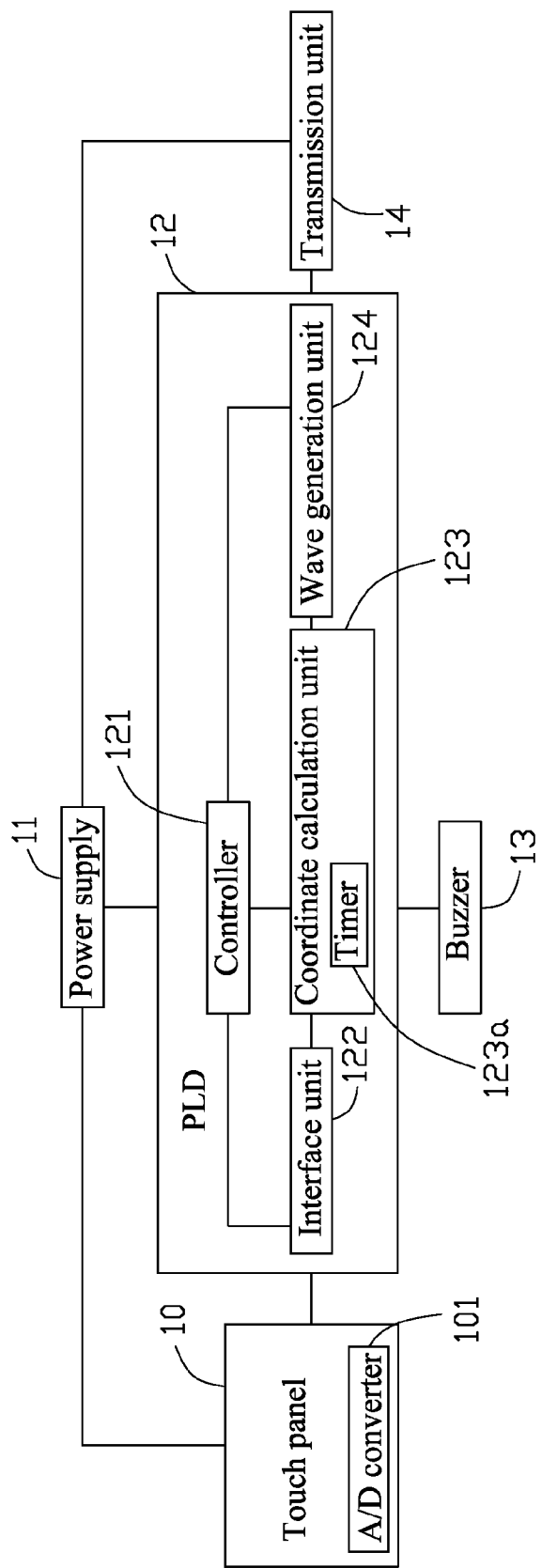
FIG. 1 is a block diagram of an exemplary embodiment of a control system of a manual pulse generator.

Referring to FIG. 1, an exemplary embodiment of a control system for a manual pulse generator includes a touch panel 10, a power supply 11, a programmable chip 12, a buzzer 13, and a transmission unit 14.

The touch panel 10 includes an analog to digital (A/D) converter 101. The programmable chip 12 includes a controller 121, an interface unit 122, a coordinate calculation unit 123, and a wave generation unit 124. The controller 121 stores a preset speed multiplier. The coordinate calculation unit 123 includes a timer 123a that can be independent from the coordinate calculation unit 123 in one embodiment. In one embodiment, the touch panel 10 is a resistive touch panel. Other kinds of touch panels can be used, such as capacitive touch panels, infrared touch panels, or acoustic wave touch panels without departing away from the spirit of the present disclosure. The programmable chip 12 can be a programmable logic device (PLD), such as a field programmable gate array (FPGA) or a complex programmable logic device (CPLD). The interface unit 122 and the transmission unit 14 can be serial protocol interfaces (SPIs), such as a RS-232, RS-422 or RS-485 interfaces, and so on. The power supply 11 provides working voltages for the control system. The PLD 12 receives electrical signals from the touch panel 10 and processes the sequence of electrical signals to determine the direction and frequency of output pulse signals therefrom. The PLD 12 transmits the pulse signals via the transmission unit 14 to control a motor of a computer numerical control (CNC) device. The buzzer 13 generates audio signals with different frequencies according to the output pulse signals from the PLD 12. Thus, the control system can generate pulse signals to control the motor of the CNC device by operation of the touch panel 10, which does not need rotors, and is easy to use for prolonged periods.

Figure 2:
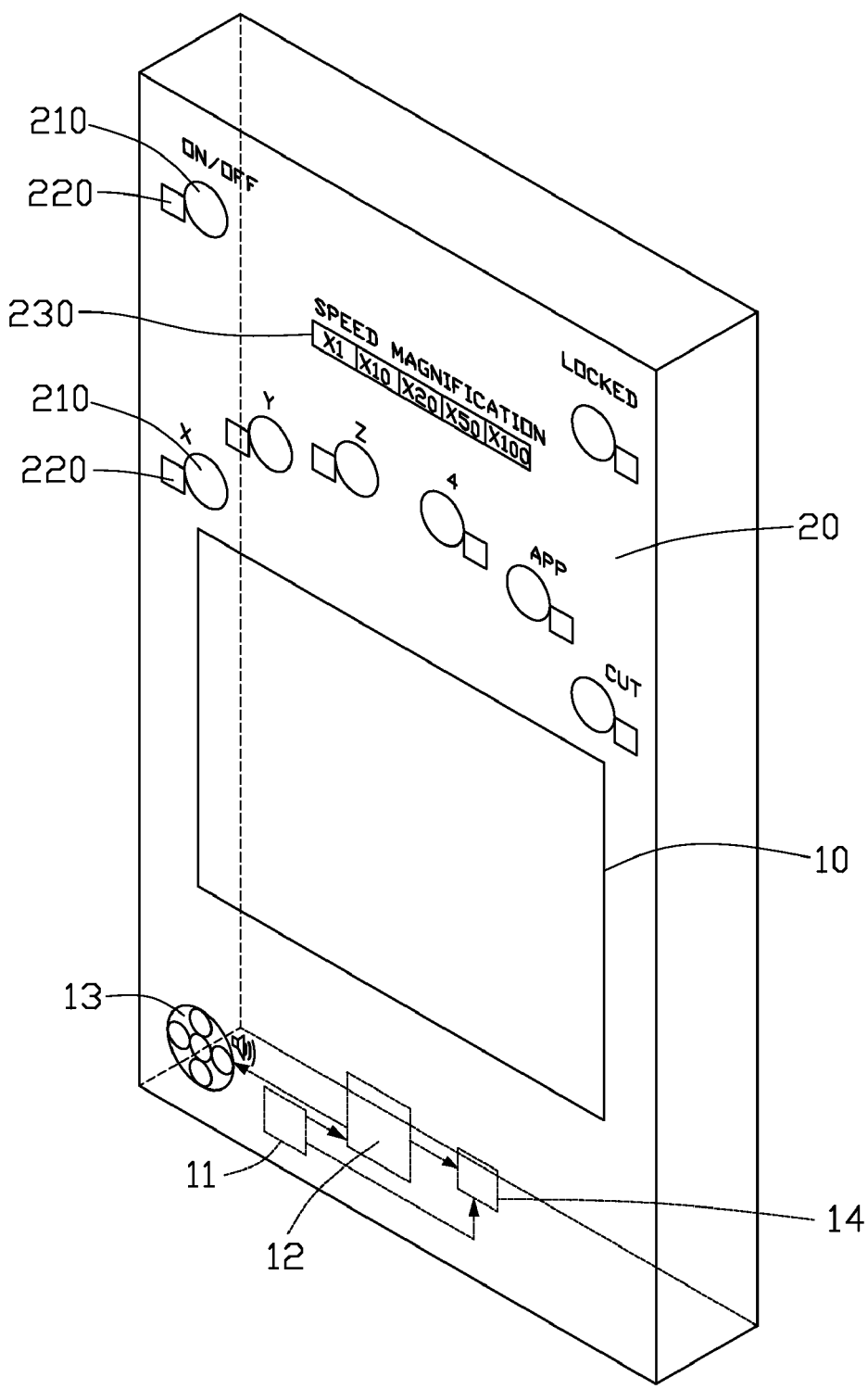
FIG. 2 is a schematic diagram of an exemplary embodiment of a front panel of the manual pulse generator of FIG. 1.

Referring to FIG. 2, a front panel 20 of the manual pulse generator includes a plurality of functional keys 210, a plurality of corresponding key indicators 220, the touch panel 10, and a plurality of corresponding speed multiplier keys 230. The plurality of functional keys 210 include a first axis selector X, a second axis selector Y, a third axis selector Z, a fourth axis selector 4, a fifth axis selector APP, a sixth axis selector CUT, a switch ON/OFF, and a lock LOCKED. Each of the plurality of functional keys 210 is configured to select a drive axis in the CNC device controlled by the control system. Each key indicator 220 is configured to show a corresponding processing function when a corresponding functional key 210, such as the first axis selector X, is activated. The plurality of speed multiplier keys 230 are configured to select a preset speed multiplier stored in the controller 121. In one embodiment, the plurality of speed multiplier keys 230 include five multipliers, "×1", "×10", "×20", "×50", and "×100" correspondingly. The touch panel 10 is arranged on the front panel 20.

The touch panel 10 is configured to generate an electrical signal in response to touch input. For example, when the touch panel 10 is contacted in an upwards motion, an upwards signal, such as an upwards vector line, is generated; when the touch panel 10 is contacted in a downwards motion, a downwards signal is generated. The touch panel 10 generates a first analog voltage signal and a second analog voltage signal corresponding to a first reference voltage along the level direction and a second reference voltage along the verticality direction for each input point of the contact signal. The A/D converter 101 is configured to convert the first and second analog signals into a first digital signal (encoded value) and a second digital signal respectively. For example, the A/D converter 101, which is a 3-bit converter in this embodiment, converts an analog voltage signal 5.2V to a digital signal 001, then transmits the first and second digital signals to the coordinate calculation unit 123 via the interface unit 122.

The coordinate calculation unit 123 records relationships between coordinates and encoded values. For example, coordinates (1,2), (3,4), and (5,6) correspond to an encoded value 010. Therefore, when the first and second digital signals for a corresponding input point of the contact signal are transmitted to the coordinate calculation unit 123, the coordinate calculation unit 123 can determine coordinates of the corresponding input point on the touch panel 10. The controller 121 controls the timer 123a to record the amount of time used to input the contact signal on the touch panel 10 by starting to time at the beginning of the contact signal, and stopping the timing at the end of the contact signal. The controller 121 determines if the inputting of the contact signal on the touch panel 10 is finished, and controls the coordinate calculation unit 123 to determine the speed and direction of the contact signal based on the coordinates of the beginning and end input points of the contact signal. For example, if the coordinates of the beginning and end input points of the contact signal, such as a vector line, are (3,4) and (6,8) respectively, the length of the vector line is $((3-6)^2+(4-8)^2)^{1/2}$, i.e., 5 cm, where the unit length of the coordinates is 1 cm, and the direction of the vector line is generally upwards. Additionally, the coordinate calculation unit 123 determines the inputting speed in, for example, unit lengths per second for the contact signal by using the length of the vector line divided the inputting time recorded by the timer 123a.

When the inputting of the contact signal on the touch panel 10 is finished, the wave generation unit 124 generates a first pulse signal and a second pulse signal according to the direction of the contact signal and the inputting speed of the contact signal. The direction of the contact signal determines phase order of the first and second pulse signals, and the inputting speed and the preset speed multiplier determines the frequency of each of the first and second pulse signals. A controlling procedure stored in the controller 121 determines corresponding relationship between the phase order of the first and second pulse signals and the rotation direction of the motor. In one embodiment, when the direction of the contact signal is upwards, the phase of the first pulse signal is in advance of the phase of the second pulse signal to drive the motor to rotate forward and vice versa when the direction is downwards. The corresponding relation ship between the direction of the contact signal and the phase order of the first and second pulse signals can be adjusted. The corresponding relation ship between the rotation direction of the motor and the phase order of the first and second pulse signals can also be adjusted.

When one of the plurality of functional keys 210, such as the first axis selector X, is activated, the controller 121 controls the transmission unit 14 to transfer the first and second pulse signals via channels corresponding to the first axis selector X to drive the motor along the X axis direction The controlling procedure uses preset/predetermined relationships between the channels and the axis selectors X, Y, Z, 4, CUT, and APP.

Figure 3:
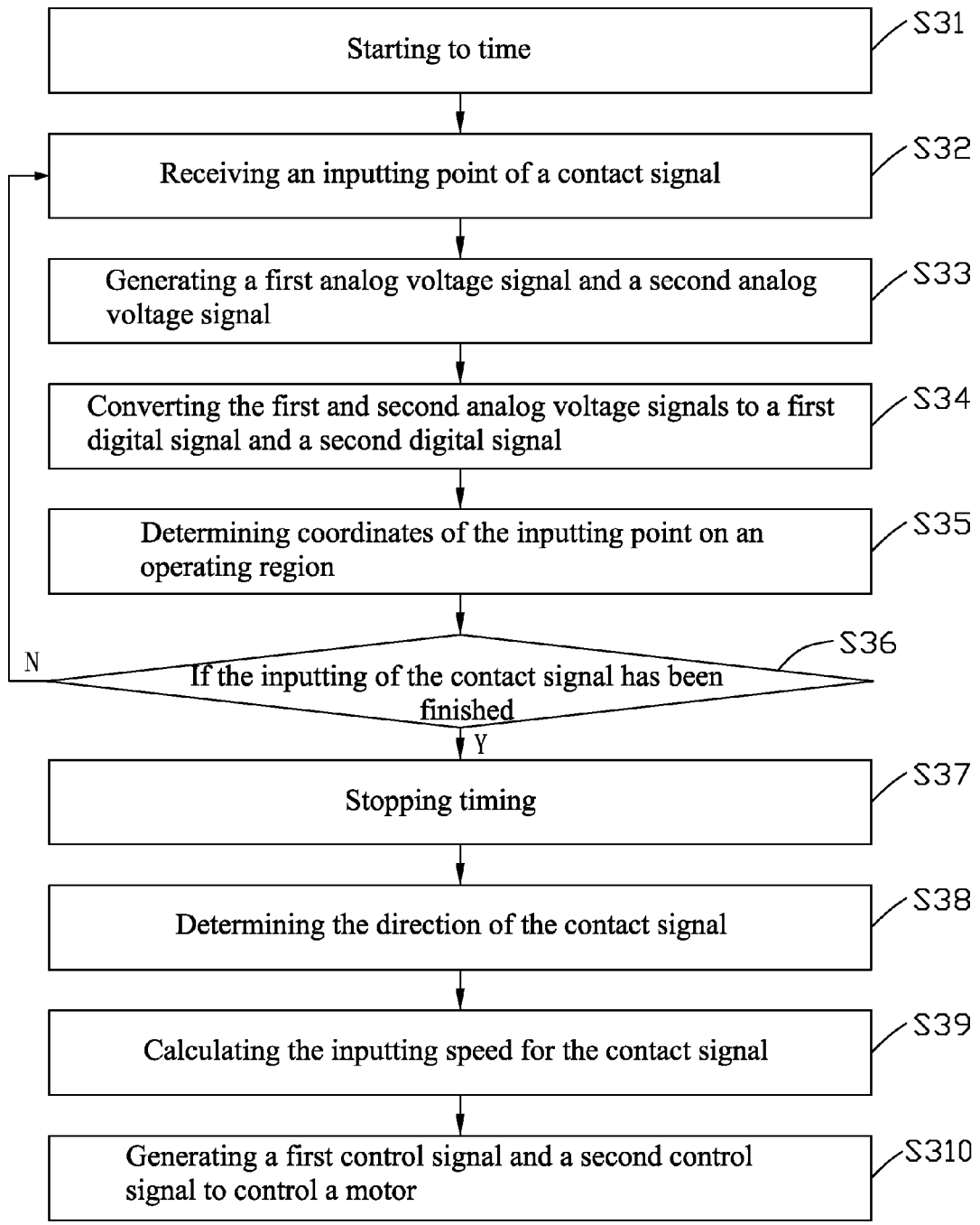
FIG. 3 is a flowchart of an exemplary embodiment of a control method of a manual pulse generator.

Referring to FIG. 3, an embodiment of a control method for a manual pulse generator for controlling rotation speed and direction of a motor includes the following steps.

In step S31, the timer 123a starts to time at the beginning of a contact signal on the touch panel 10.

In step S32, the touch panel 10 receives a first inputting point of the contact signal at beginning of the contact signal.

In step S33, the touch panel 10 generates a first analog voltage signal and a second analog voltage signal corresponding to voltages of the inputting point along the level and the verticality direction respectively.

In step S34, the A/D converter 101 converts the first and second analog voltage signals to a first digital signal and a second digital signal, and transmits the first and second digital signals to the coordinate calculation unit 123.

In step S35, the coordinate calculation unit 123 determines coordinates of the inputting point on the touch panel 10 according to relationships between coordinates and encoded values pre-stored in the controller 121.

In step S36, the controller 121 determines if the inputting of the contact signal on the touch panel 10 has been finished; if the inputting has been finished, the procedure goes to step S37, otherwise, the procedure returns to step S32.

In step S37, the timer 123a stops timing to get the amount of time used to input the contact signal on the touch panel 10.

In step S38, the coordinate calculation unit 123 determines the length and direction of the contact signal according to the first inputting point and a last point of the contact signal at the end of the contact signal.

In step S39, the coordinate calculation unit 123 calculates an inputting speed for the contact signal by using the length of the contact signal divided the recorded time.

In step S310, the wave generation unit 120 generates a first pulse signal and a second pulse signal to control the motor according to the direction of the contact signal and the inputting speed for the contact signal. The direction of the contact signal determines the phase order of the first and second pulse signals to determine the rotation direction of the motor. The inputting speed and a preset speed multiplier stored in the controller 121 determine the frequency of each of the first and second pulse signals to determine the rotation speed of the motor.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching. The embodiments were chosen and described in order to explain the principles of the invention and their practical application so as to enable others skilled in the art to utilize the disclosure and various embodiments and with various modifications as are suited to the particular use contemplated. Alternative embodiments will become apparent to those of ordinary skills in the art to which the disclosure pertains without departing from its spirit and scope. Accordingly, the scope of the disclosure is defined by the appended claims rather than the foregoing description and the exemplary embodiments described therein.

What is claimed is:

1. A control system of a manual pulse generator for controlling a rotation speed and a rotation direction of a motor, the control system comprising:
   a touch panel to receive a contact signal and generating an electrical signal according to the contact signal;
   a timer to record the amount of time used to input the contact signal on the touch panel;
   a coordinate calculation unit to calculate coordinates of each input point of the contact signal on the touch panel according to the electrical signal to determine a direction of the contact signal and input speed for the contact signal;
   a wave generation unit that generates a pulse signal to control the motor according to the direction of the contact signal and the input speed for the contact signal, wherein the direction of the contact signal and the input speed for the contact signal determine the rotation direction and rotation speed of the motor, respectively.

2. The control system of claim 1, further comprising:
   a serial peripheral interface (SPI) unit that receives the electrical signal from the touch panel, and transfers the electrical signal to the coordinate calculation unit; and
   a controller that stores a preset speed multiplier to determine the rotation speed of the motor with the inputting speed for the contact signal;
   wherein the timer, the coordinate calculation unit, the wave generation unit, the SPI unit, and the wave generation unit are located on a programmable chip.

3. The control system of claim 2, still further comprising:
   a transmission unit to transmits the pulse signal to the motor; and
   a power supply to provide a working voltage for the touch panel, the programmable chip, and the transmission unit.

4. The control system of claim 2, wherein the programmable chip is a field programmable gate array or a complex programmable logic device.

5. The control system of claim 1, wherein the touch panel comprises an analog to digital (A/D) converter, the electrical signal includes a first digital signal and a second digital signal, the touch panel generates a first analog voltage signal and a second analog voltage signal corresponding to a first reference voltage along the level direction and a second reference voltage along the verticality direction for each input point of the contact signal, the A/D converter is configured to convert the first and the second analog voltage signals into the first digital signal and the second digital signal, respectively.

6. The control system of claim 1, wherein the touch panel is a capacitive touch panel, a resistance touch panel, a wave touch panel, or an infrared touch panel.

7. The control system of claim 1, further comprising:
a buzzer that generates audio signals with different frequencies according to the pulse signal from the wave generation unit.

8. The control system of claim 1, wherein the pulse signal comprises a first pulse signal and a second pulse signal; the direction of the contact signal determines phase order of the first and second pulse signals to determine the rotation direction of the motor; the inputting speed for the contact signal and a preset speed multiplier determine the frequency of each of the first and second pulse signals to determine the rotation speed of the motor.

9. A control method of a manual pulse generator for controlling a rotation speed and a rotation direction of a motor, the control method comprising:
generating an electrical signal according to a contact signal by a touch panel;
recording a time to input the contact signal on the touch panel by a timer;
calculating coordinates of each input point of the contact signal to determine a direction of the contact signal and input speed for the contact signal by a coordinate calculation unit, wherein the input speed for the contact signal is determined by the recorded time; and
generating a pulse signal to control the motor according to the direction of the contact signal and the input speed for the contact signal by a wave generation unit, wherein the direction of the contact signal and the input speed for the contact signal determine the rotation direction and the rotation speed of the motor respectively.

10. The control method of claim 9, wherein the step of generating the electrical signal includes generating a first analog voltage signal and a second analog voltage signal corresponding to a first reference voltage along the level direction and a second reference voltage along the verticality direction for each input point of the contact signal by the touch panel, and converting the first and the second analog voltage signals into a first digital signal and a second digital signal, respectively, by an analog to digital converter in the touch panel.

11. The control method of claim 10, further comprising:
receiving the digital signal, and transferring the digital signal to the coordinate calculation unit by a serial peripheral interface (SPI) unit;
storing a preset speed multiplier in a controller to determine the rotation speed of the motor with the inputting speed for the contact signal; and
transmitting the pulse signal to the motor by a transmission unit.

12. The control method of claim 9, wherein the pulse signal comprises a first pulse signal and a second pulse signal; the direction of the contact signal determines the phase order of the first and second pulse signals to determine the rotation direction of the motor; the inputting speed for the contact signal and a preset speed multiplier determine the frequency of each of the first and second pulse signals to determine the rotation speed of the motor.

13. The control system of claim 1, wherein the input speed for the contact signal is determined by the recorded time.

14. The control system of claim 1, further comprising a controller controlling the timer to record the amount of time used to input the contact signal on the touch panel by starting to time at the beginning of the contact signal and stopping the timing at the end of the contact signal, and controlling the coordinate calculation unit to determine the direction of the contact signal and the input speed for the contact signal based on the coordinates of the beginning input point and the end input point of the contact signal.

15. The control system of claim 5, wherein the coordinate calculation unit includes a plurality of relationship data between coordinates on the touch panel and the digital signals, when the coordinate calculation unit receives the first and second digital signals for an input point of the contact signal, the coordinate calculation unit uses the relationship data to calculate the coordinate of the input point on the touch panel corresponding to the contact signal according to the electrical signal.

16. The control method of claim 9, further comprising:
controlling the timer to record the amount of time used to input the contact signal on the touch panel by starting to time at the beginning of the contact signal and stopping the timing at the end of the contact signal by a controller; and
controlling the coordinate calculation unit to determine the direction of the contact signal and the input speed for the contact signal based on the coordinates of the beginning input point and the end input point of the contact signal by the controller.

17. The control method of claim 10, further comprising using a relationship data between coordinates on the touch panel and the digital signals to calculate the coordinate of an input point on the touch panel corresponding to the contact signal according to the electrical signal by the coordinate calculation unit when receiving the first and second digital signals for the input point of the contact signal, wherein the coordinate calculation unit includes a plurality of the relationship data.

* * * * *